United States Patent [19]

Enokida

[11] Patent Number: 5,608,862
[45] Date of Patent: Mar. 4, 1997

[54] APPARATUS FOR PROCESSING HIERARCHICALLY-CODED IMAGE DATA

[75] Inventor: Miyuki Enokida, Yokohama, Japan

[73] Assignee: Canon Kabushiki Kaisha, Tokyo, Japan

[21] Appl. No.: 424,593

[22] Filed: Apr. 17, 1995

Related U.S. Application Data

[63] Continuation of Ser. No. 997,935, Dec. 29, 1992, abandoned.

[30] Foreign Application Priority Data

Jan. 6, 1992 [JP] Japan ................................. 4-000109

[51] Int. Cl.$^6$ ............................................. G06F 15/00
[52] U.S. Cl. ................... 395/501; 395/507; 345/202; 382/232; 382/305
[58] Field of Search ...................... 395/162–166; 358/133, 957, 261.4; 382/56, 232, 237, 240, 244, 247, 298, 299, 305; 345/112, 113, 127–131, 185, 186, 189, 202, 203; 348/390, 400, 403, 409, 420, 422

[56] References Cited

U.S. PATENT DOCUMENTS

| | | | |
|---|---|---|---|
| 4,729,020 | 3/1988 | Schaphorst et al. | 358/133 |
| 4,742,558 | 5/1988 | Ishibashi et al. | 382/240 |
| 5,060,280 | 10/1991 | Mita et al. | 382/283 |
| 5,093,907 | 3/1992 | Hwong et al. | 395/152 |
| 5,121,448 | 6/1992 | Katayama et al. | 382/284 |
| 5,122,875 | 6/1992 | Raychaudhuri et al. | 348/390 |
| 5,142,616 | 8/1992 | Kellas et al. | 395/135 |
| 5,251,046 | 10/1993 | Kato et al. | 358/457 |
| 5,327,248 | 7/1994 | Miller et al. | 358/261.4 |

FOREIGN PATENT DOCUMENTS

| | | | |
|---|---|---|---|
| 0152355 | 8/1985 | European Pat. Off. | H04N 1/41 |
| 4002179 | 8/1990 | Germany | H04N 1/00 |

*Primary Examiner*—Kee M. Tung
*Assistant Examiner*—U. Chauhan
*Attorney, Agent, or Firm*—Fitzpatrick, Cella, Harper & Scinto

[57] ABSTRACT

Apparatus and method for processing hierarchically-coded image data includes structure and steps for storing hierarchically-coded image data and providing a first image data by decoding the hierarchically-coded image data. The first image data having a first resolution is stored in a display memory. The stored first image data is displayed on a display, and an area within the displayed first image is designated for a second image. The second image data is provided by decoding the hierarchically-coded image data and is representative of an image in the designated area of the first image. The second image data having a second resolution is stored in a portion of the display memory while the memory maintains the first image data stored therein. Finally, the display displays a combined image including the first image having the first resolution and the second image having the second resolution.

20 Claims, 9 Drawing Sheets

FIG. 5

| RESOLUTION (dpi) | IMAGE SIZE | STRIPE WIDTH |
|---|---|---|
| 400 | 3360 x 4752 | 128 |
| 200 | 1680 x 2376 | 64 |
| 100 | 840 x 1188 | 32 |
| 50 | 420 x 594 | 16 |
| 25 | 210 x 297 | 8 |
| 12.5 | 105 x 149 | 4 |

APPARATUS FOR PROCESSING HIERARCHICALLY-CODED IMAGE DATA

This application is a continuation, of application Ser. No. 07/997,935 filed Dec. 29, 1992, now abandoned.

BACKGROUND OF THE INVENTION

This invention relates to an image processing method for storing hierarchically coded image data, decoding the stored data and then outputting the same, as well as an apparatus for practicing this method.

Methods which can be utilized for coding binary image data in the prior art include MH, MR and MMR methods. According to these coding methods, an image is coded sequentially from the top down. Consequently, in a case where an original image having a high resolution of 400 dpi, for example, is displayed on a computer display unit (a low-resolution CRT) or the like, the arrangement is such that the coded data is decompressed and converted into the original image data, after which the resulting image is displayed.

A "Progressive Bi-level Image Compression Method-JBIG (Joint Bi-level Image Group) Algorithm" is described in *THE JOURNAL OF THE INSTITUTE OF IMAGE ELECTRONICS OF JAPAN* (1991, Vol. 20, No. 1). This coding method is a method of progressive bi-level image compression. This is a method of variable-length coding, in which the coded data is managed as one file.

It is possible also to adopt an arrangement in which the original image data is held directly without performing the coding of the binary image data.

However, if the original image has a resolution of 400 dpi in size A4, for example, the total number of pixels is 4752×3360 pixels in the above-described example of the prior art. Since the resolution of a CRT for displaying images is on the order of 1024×1024, the following problems arise:

(1) In a case where detailed data in a certain rectangular area within a reduced image displayed on a CRT is to be displayed in enlarged form or the entire image is desired to be enlarged, enlarging the reduced image data results in enlargement of the image size, but there is no increase in resolution and special-purpose hardware for enlargement is required. Further, in a case where reduction is carried out again from the original image, performing this based upon coded data requires that execution be carried out again upon changing the reduction ratio, as mentioned in (1) above. This takes time. Furthermore, in a case where an original image whose coded data has been decompressed is stored in a memory in advance and the original image is reduced directly without performing the coding, a buffer memory [having a capacity of (4752×3360)/8 bytes if the original image is composed of 4752×3360 pixels] is required in order to store the original image in its entirety.

(2) In case of the JBIG method, hierarchical coding is performed, in which coding is carried out for every resolution.. If the coded data (hereinafter referred to as a "bit stream") is one file, there is no tag information such as the bit length of every layer and stripe with just the bit stream. As a consequence, random access of rectangular areas and the like in an image is impossible, and the bit stream must be decoded from the beginning.

SUMMARY OF THE INVENTION

Accordingly, an object of the present invention is to provide a method and apparatus for image processing, in which desired coded data can be processed at high speed through a simple arrangement and in conformity with the resolution of the image to be outputted.

Another object of the present invention is to provide a method and apparatus for image processing, in which tag information can be set for every layer of a hierarchically coded image and the coded data can be decoded at high speed based upon the tag information.

According to the present invention, there is provided an image processing apparatus comprising storing means for storing hierarchically coded image data, decoding means for decoding the stored data, setting means for setting tag information corresponding to the data stored in the storing means, and control means for controlling the decoding means based upon the tag information set by the setting means.

In the above-described arrangement, image data is coded hierarchically, tag information corresponding to the coded data is set, and the coded data is stored. The stored data is decoded and outputted based upon the tag information.

These problems also occur to the other hierarchical coding method, for example, the JPEG method without being limited to the JPIG method.

Other features and advantages of the present invention will be apparent from the following description taken in conjunction with the accompanying drawings, in which like reference characters designate the same or similar parts throughout the figures thereof.

Further, the present invention is to provide an apparatus in which image data which each hierarchy differs from other among hierarchically stored image data can be recognized at the same time.

BRIEF DESCRIPTION OF THE DRAWINGS

FIG. 5 is a diagram illustrating the relationship between hierarchy and resolution, size and stripe width;

DESCRIPTION OF THE PREFERRED EMBODIMENTS

Preferred embodiments according to the present invention will now be described with reference to the drawings.

Figure 1:
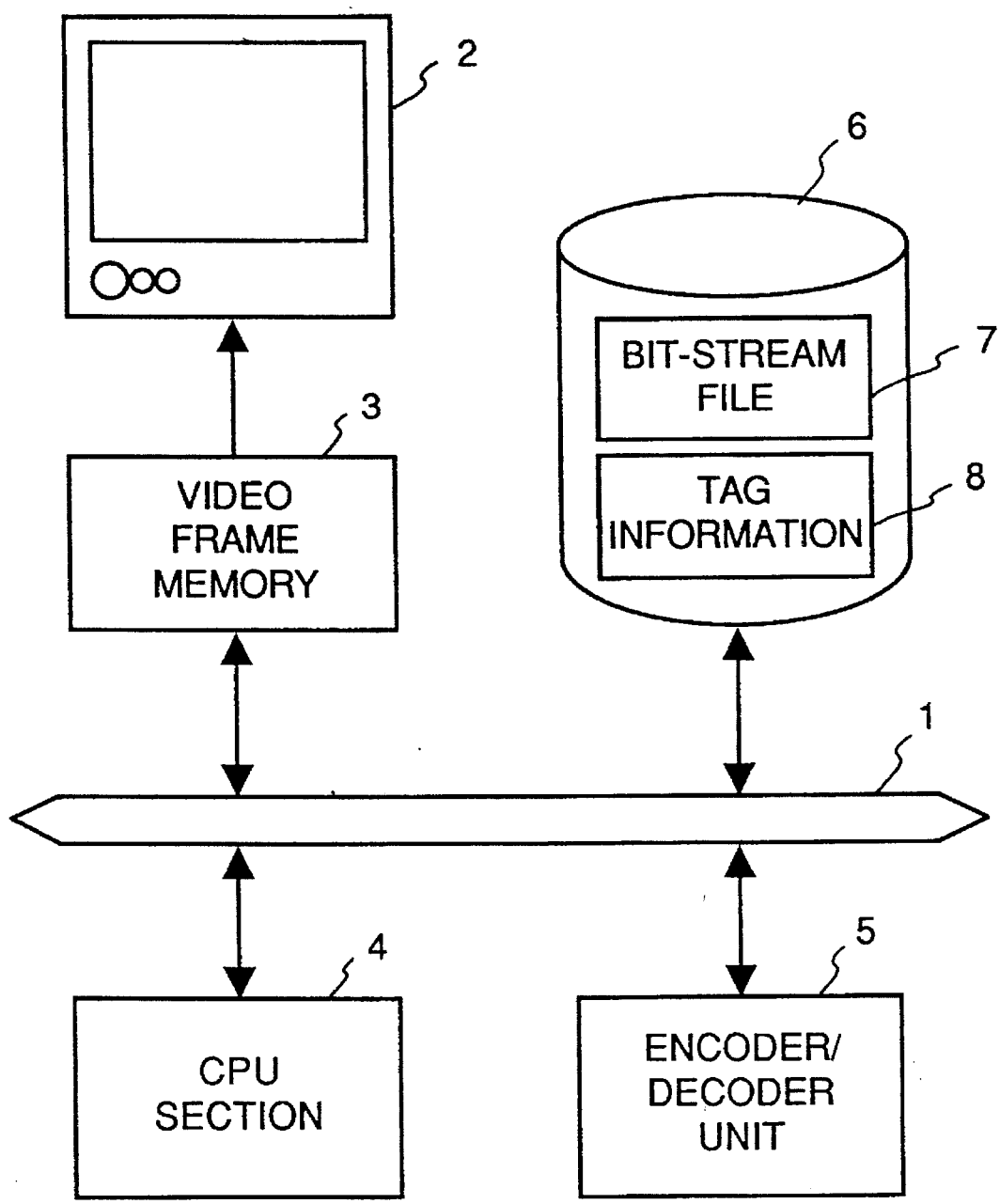
FIG. 1 is a block diagram showing the overall construction of a system according to an embodiment of the invention.

FIG. 1 is a block diagram showing the overall construction of a system according to an embodiment of the invention. The system includes a system bus 1 to which the devices belonging to the system are connected, an image display unit 2 as constituted by a CRT, and a video frame memory 3 for displaying images on the CRT 2. The video frame memory 3 applies processing such as a D/A conversion to an image that has been written in, and outputs the results of processing to the CRT 2. The system further includes a CPU section 4, which has a CPU for controlling the overall system, a memory for loading programs and the like, etc., an encoder/decoder unit 5 which performs hierarchical coding/decoding such as JBIG, and a storage device 6 such as a hard disk for storing image data, programs, etc. The binary image data that has been stored in the storage device 6 is composed of a bit-stream file 7 hierarchically coded by the encoder/decoder unit 5, and a tag-information file 8, the details of which will be described later. The encoder/decoder unit 5 reads in the bit-stream file 7 designated from the CPU section 4 and writes image data, which is the result of decompression, in a relevant location of the video frame memory 3.

The binary image data that has been stored in the storage device 6 may be image data inputted by image input means such as a scanner or image data sent via a communication line, not shown.

The concept of resolution and stripes in hierarchical coding will be described with reference to FIG. 2.

In the case of the JBIG method, for example, there is a concept referred to as stripe processing in order to arrange it so that accessing can be performed in a single data base and in both a progressive and sequential manner. FIG. 2 is a diagram illustrating this concept. If the resolution of an original image is 400 dpi, for example, then resolution is successively halved in the vertical and horizontal directions in the manner 200 dpi, 100 dpi, 50 dpi, 25 dpi, 12.5 dpi. In this example, D in FIG. 2 is assumed to be "5". Further, stripe width is assumed to be "128" (128 lines are taken as being one stripe at 400 dpi). If the size of the original image is represented by "Y", then the stripes will be Y/128. For example, if Y=1951 holds, then 1951/128=15, with a remainder of 31, so that S in FIG. 2 becomes "16".

Figure 2:
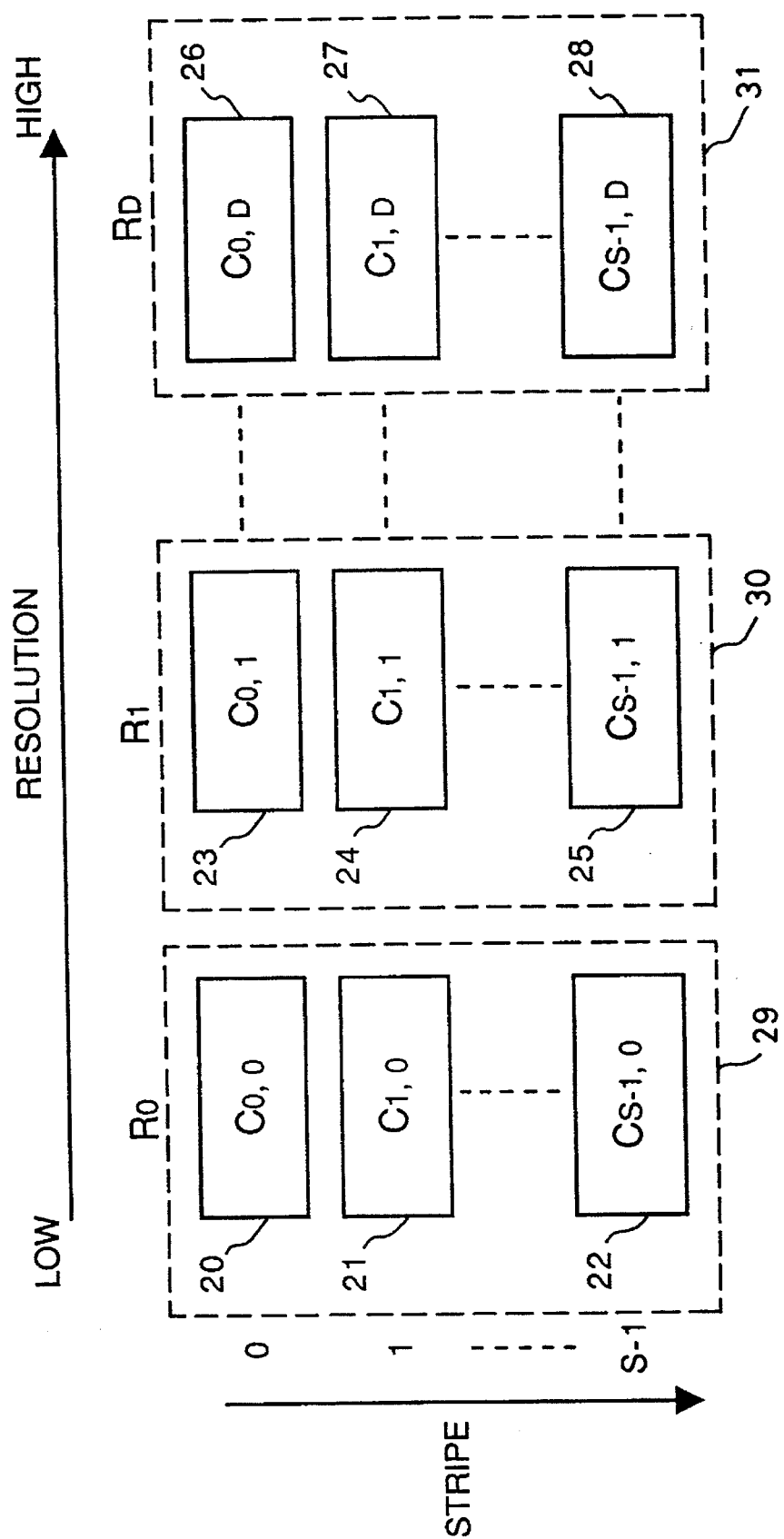
FIG. 2 is a diagram for describing resolution and stripes in hierarchical coding.

As shown in FIG. 2, $C_{0,0}$ 20, $C_{1,0}$ 21, ..., $C_{S-1,0}$ 22 represent the bit streams of every stripe (processing unit) of resolution $R_0$, $C_{0,1}$ 23, $C_{1,1}$ 24, ..., $C_{S-1,1}$ 25 represent the bit streams of every stripe of resolution $R_1$, and $C_{0,D}$ 26, $C_{1,D}$ 27, ..., $C_{S-1,D}$ 28 represent the bit streams of every stripe of resolution $R_D$. The resolutions $R_0$, $R_1$ are referred to as layers when viewed in the direction of resolution. In a case where a group of these bit streams is made a single bit-stream file, the bit streams are arranged in ascending order of resolution and in ascending order of stripe number, by way of example. As a result, the following is obtained:

$C_{0,0}$ 20, $C_{1,0}$ 21, ..., $C_{S-1,0}$ 22, $C_{0,1}$ 23, $C_{1,1}$ 24, ..., $C_{S-1,1}$ 25, $C_{0,D}$ 26, $C_{1,D}$ 27, ..., $C_{S-1,D}$ 28

This is stored in the storage device 6, shown in FIG. 1, as one file.

The detailed data format of the tag information 8 stored in the storage device 6 will now be described. In this embodiment, a case will be described in which the tag information 8 is set for every layer (resolution) and stored. First, the CPU of the CPU section 4 obtains the sum total of byte lengths of the bit streams of every layer, namely the byte lengths of the bit streams up to $C_{0,0}$ 20, $C_{1,0}$ 21, ..., $C_{S-1,0}$ 22 inside 29 in FIG. 2, as the tag information, and stores this sum total in $TL_0$ 32 shown in FIG. 3. Similarly, the CPU stores the sum total of byte lengths inside 30 of FIG. 2 in $TL_1$ 33 as well as the sum total of byte lengths inside 31 of FIG. 2 in $TL_{S-1}$ 34.

Described below is an image display method through which the bit-stream file, in which the byte lengths ($TL_0$ 32, $TL_1$ 33, ..., $TL_{S-1}$ 34) of every layer have been added on as the tag information 8, is displayed on the image display unit 2.

It will be assumed that the size of the original image is 400 dpi, A4 (3360×4752 pixels), that stripe width at 400 dpi is 128 lines, and that the differential layer number is 5. In this case, therefore, the resolution, image size and stripe width of each layer are as illustrated in FIG. 5. Further, the resolution of the image display unit 2 in this embodiment is assumed to be 1024×1024.

Figure 4:
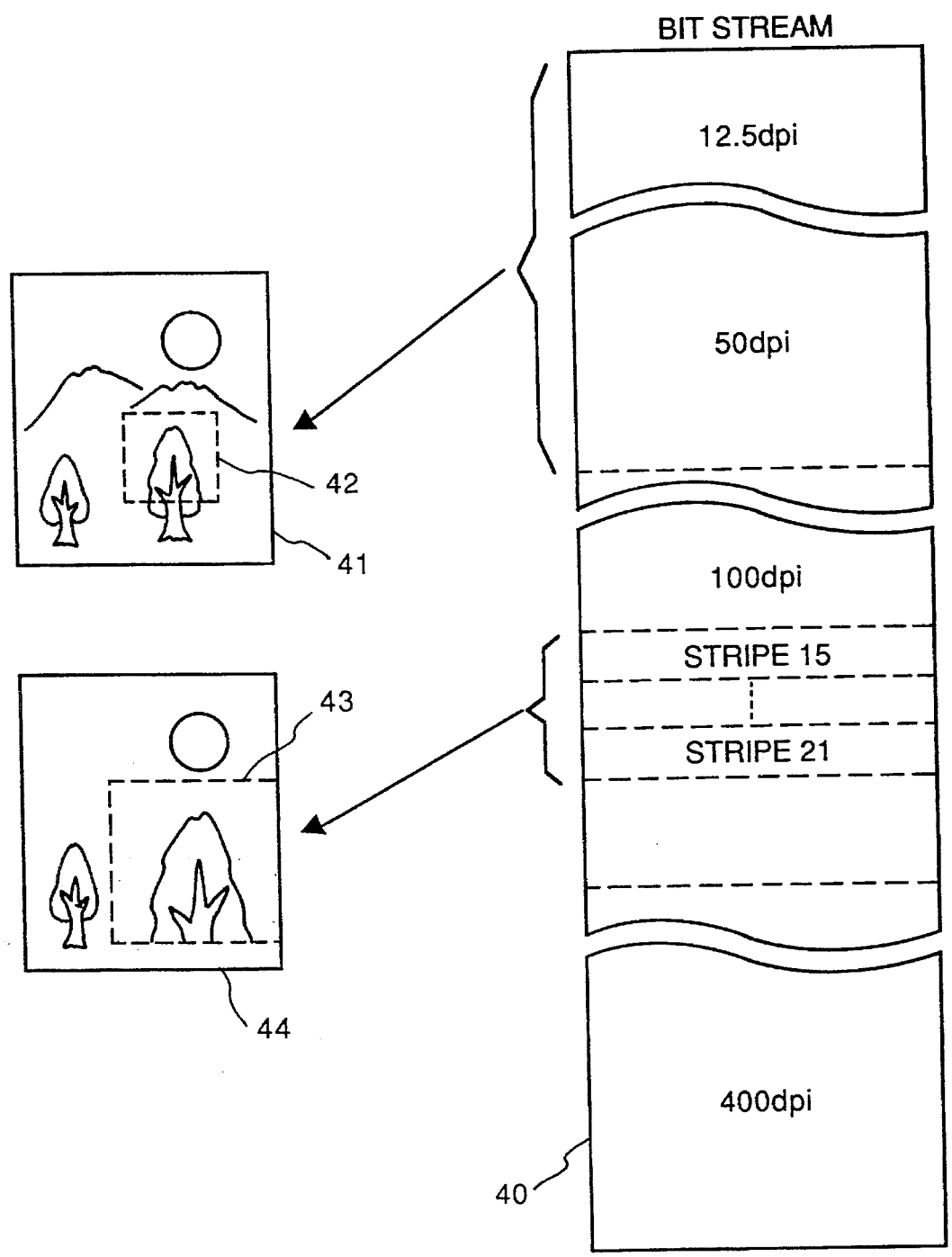
FIG. 4 is a diagram for describing processing through which an image is decoded from a bit stream.

The display operation according to this embodiment will now be described with reference to FIG. 4.

First, by using a keyboard or mouse, not shown, the user indicates that the entire image is desired to be displayed. When this is done, the CPU of the CPU section 4 reads out the pertinent bit-stream file 7 from the storage device 6 and instructs the encoder/decoder unit 5 to begin decoding. In response, the bit streams up to 50 dpi in FIG. 5, namely the bit streams of 12.5 dpi, 25 dpi and 5 p dpi, are decoded from the resolution of the image display unit 2 and the image size of each layer in order to display the entirety of the image. In other words, if a data structure 40 within the bit-stream file 7 has been stored in ascending order, namely in order from low to high resolutions, as shown in FIG. 4, the encoder/decoder unit 5 performs decoding in order starting from the beginning of the bit streams.

Next, when bit-stream decoding has been performed up to 50 dpi, the encoder/decoder unit 5 temporarily stops operating. Here the encoder/decoder unit 5 successively writes the decoded image data in the pertinent location of the video frame memory 3 of FIG. 1. For example, if the image decoded up to 50 dpi is image 41 shown in FIG. 4, then image 41 is displayed on the image display unit 2.

An example will now be described in which the user designates enlargement (display of an image having a higher resolution) of a rectangular area 42 in FIG. 4 using a keyboard or mouse, not shown.

Figure 6:
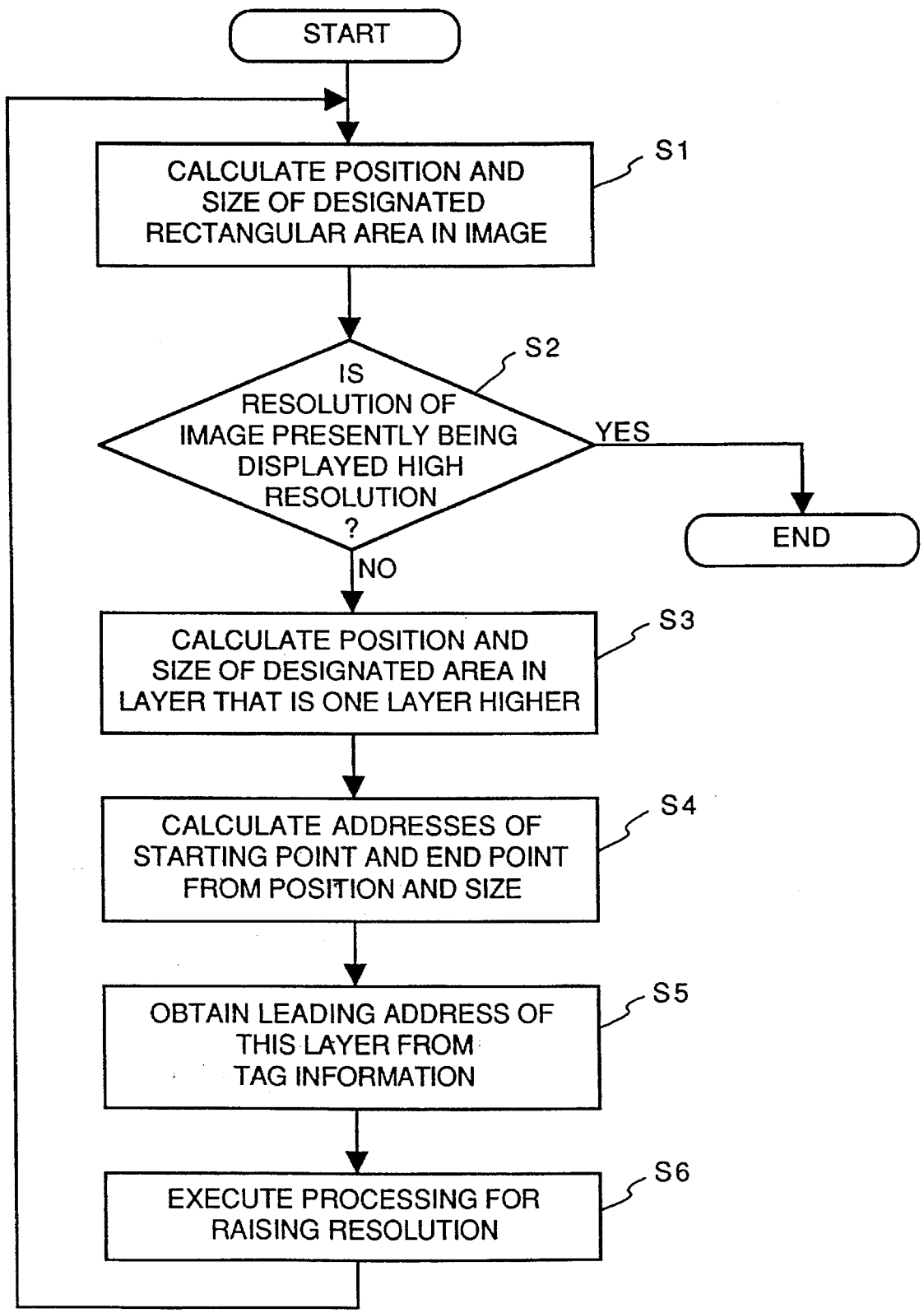
FIG. 6 is a flowchart illustrating enlargement display processing in this embodiment.

First, in accordance with the flowchart shown in FIG. 6, the CPU of CPU section 4 calculates the position of the rectangular area 42, which has been designated by the user, on the screen of the display unit, as well as the size of the area in the X and Y directions (step S1). For example, assume that the addresses of the position are X address=200, Y address=250, and that the size is X size=100 and Y size=100. Next, it is determined whether the resolution of the image presently being displayed is the maximum resolution (step S2). If the result of the determination is maximum resolution, then processing is terminated. If the resolution is not the maximum resolution, the program proceeds to step S3. More specifically, in this embodiment, the resolution of the image presently being displayed is 50 dpi, and the maximum resolution is 400 dpi. Therefore, the program proceeds to step S3, where the CPU calculates the position and size of the designated area in the layer that is one layer higher. This calculation is based upon the values obtained at step S1 described above. The processing of step S3 involves obtaining the addresses of the position and the size of the image data having a resolution of 100 dpi. More specifically, the addresses of the position are X address=400, Y address=500, and the size is X size=200, Y size=200.

Figure 3:
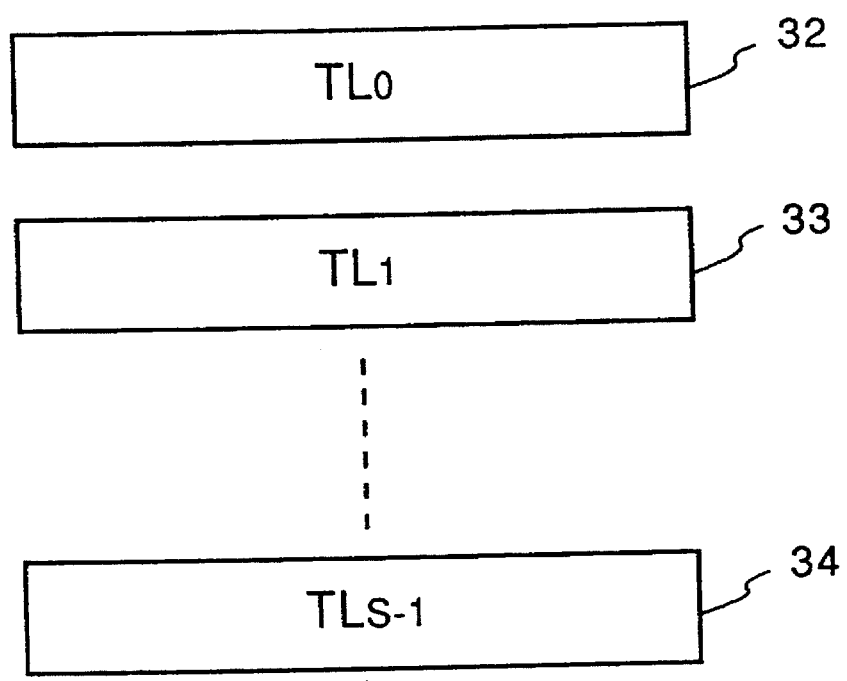
FIG. 3 is a diagram for describing the format of tag information in this embodiment.

Next, at step S4, the CPU calculates the starting point and end point of the designated rectangular area 42 based upon the values obtained at step S3. As a result, in the example described above, the starting point address is (400, 500) and the end point address is (600, 700). The program then proceeds to step S5, where the CPU obtains, from the tag information 8, the byte number at which the 100 dpi bit stream starts in the bit-stream file 7. Since the byte lengths of the bit streams of every layer have been stored as the tag information 8, as shown in FIG. 3, it will suffice if this processing adds up the tag information (the number of bytes) from 12.5 dpi to 50 dpi. Accordingly, an offset value can be calculated from the beginning of the bit-stream file 7, and it is possible to read out the 100 dpi bit stream directly. This is followed by step S6, at which processing for raising resolution is executed.

The processing executed by the encoder/decoder unit 5 to decode the bit stream that has been read out will now be described.

Figure 7:
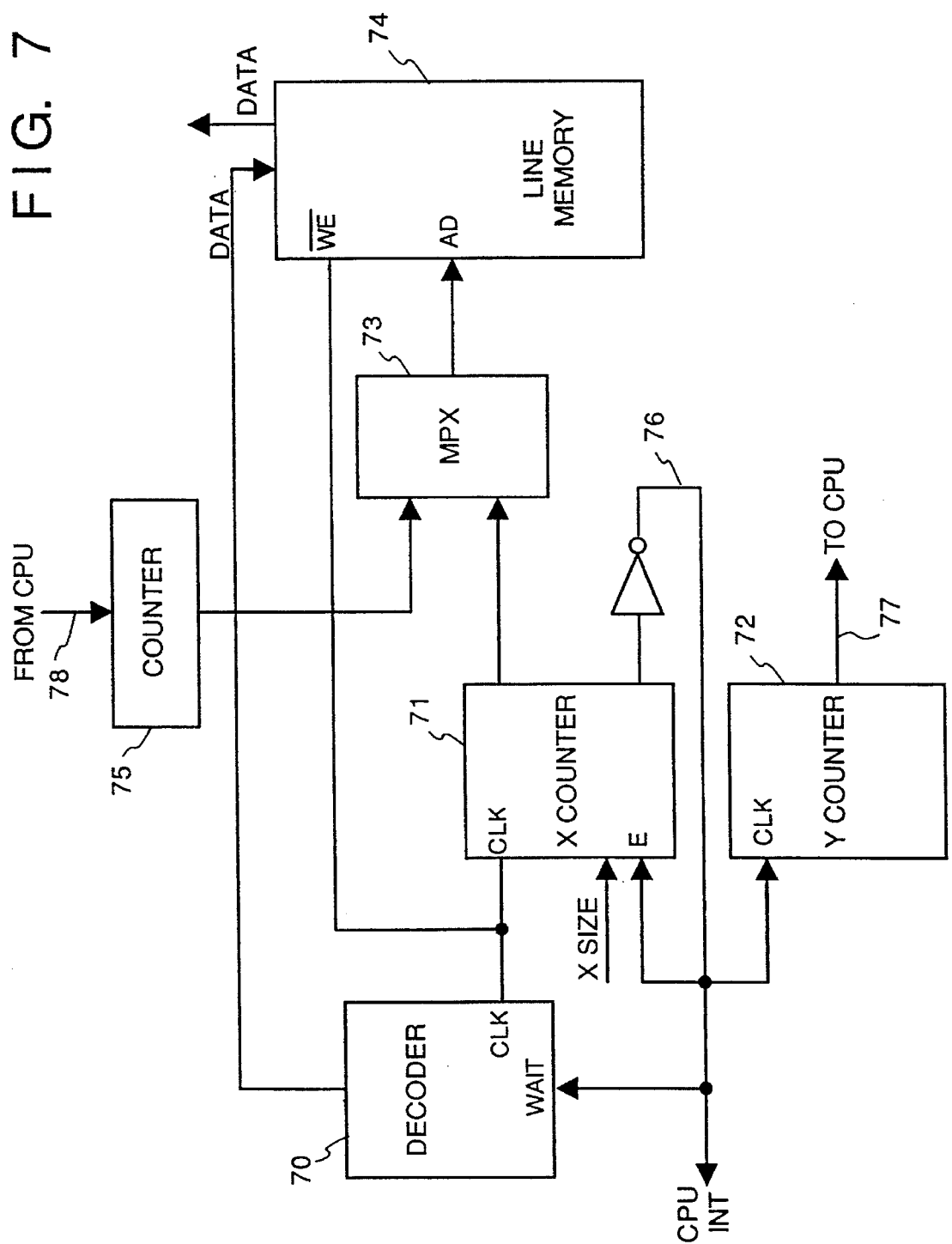
FIG. 7 is a block diagram illustrating a decoder in an encoder/decoder unit according to this embodiment.

FIG. 7 is a block diagram illustrating the detailed construction of the decoder in the encoder/decoder unit 5 according to this embodiment. Numeral 70 denotes a decoder which decodes a hierarchical code of the JBIG type. Numeral 71 denotes an X counter the X size of which is the present resolution. Since the resolution is 100 dpi in this embodiment, the counter is set to 840 pixels. The counter 71 counts up the number of pixels in the X direction in synchronization with a CLK signal at which one pixel of image data is decoded and outputted by the decoder 70. When the value of the count becomes equal to the X size, the counter 71 outputs a carry signal 76. As a result, a signal is applied to a counter-enable (E) terminal, whereby the operation of the counter 71 is halted. The carry signal 76 is applied to the decoder 70 as a wait signal, thereby halting the decoding operation. Furthermore, the carry signal functions also as a CPU-INT signal, which informs the CPU of the fact that the decoding of one line has ended. The counted value in the X counter 71 is cleared to "0". The counted value outputted by the X counter 71 serves as a write address of a line memory 74, described later.

Numeral 72 denotes a Y counter for counting addresses in the Y direction during decoding. The counter 72 is counted up based upon the signal 76 outputted whenever the X counter 71 counts up to the X size, and outputs a count value that is transmitted to the CPU. The signal is used in determining whether the decoder data is to be displayed. Numeral 73 denotes an MPX (multiplexer), which changes over between the address from the X counter 71 and an address for when access is made from the CPU. Numeral 74 denotes a line memory, in which data (image data) outputted by the decoder 70 is written at an address received from the MPX 73. Accordingly, the line memory 74 requires a capacity equivalent to the X size of the maximum resolution, namely a capacity of no less than 3360 pixels in the case of this embodiment. Numeral 75 denotes a counter in which a read address for the line memory 74 is set by the CPU.

Figure 8:
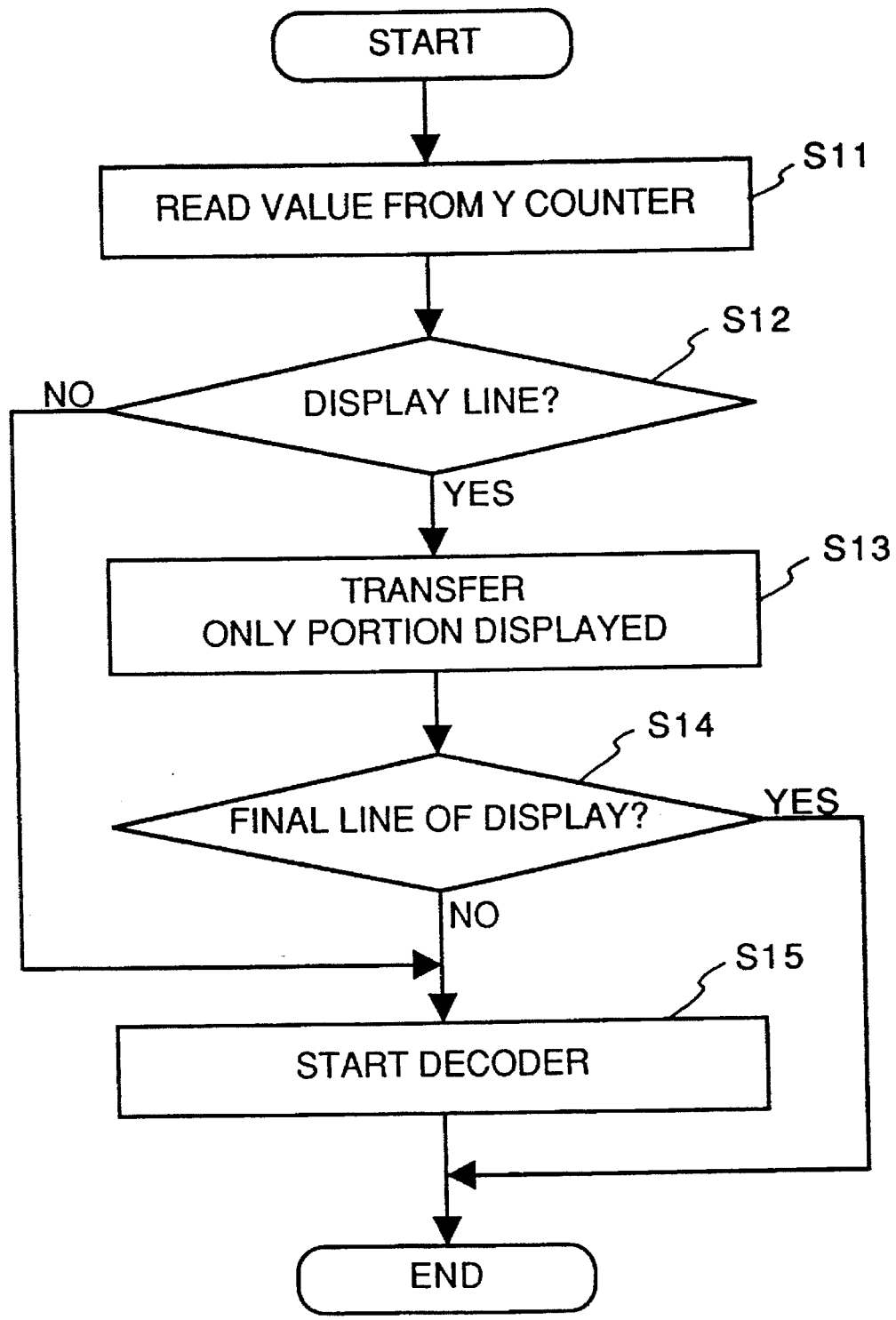
FIG. 8 is a flowchart illustrating display transfer processing in this embodiment.

The CPU sends a decode starting signal to the decoder having the construction described above, and the CPU executes the processing of FIG. 8 whenever the above-mentioned INT signal is inputted thereto.

FIG. 8 is a flowchart illustrating processing for transferring the decoded image data to the video frame memory 3. First, the value of the count in the Y counter 72 of FIG. 7 is read in at step S11, after which this value and the starting address (400, 500) are compared at step S12. If the value of the count is smaller than the starting address, it is determined that this is not a display line and the program proceeds to step S15. Here the decoder is started to begin the decoding of the next line. If a display line is found at step S12, on the other hand, the program proceeds to step S13, at which the CPU instructs the counter 75 of FIG. 7 of the fact that 200 pixels of image data are to be read out of the line memory 74 from the X address (500). As a result, the relevant image data is transferred from the line memory 74 to the relevant position of the video frame memory in FIG. 1. It is determined at step S14 whether the line displayed is the final line. If it is not the final line, the program proceeds to step S15, at which the decoder is started to begin the decoding of the next line.

The foregoing processing is repeated. When processing up to the final line ends, the rectangular area 42 is displayed as a rectangular area 43 having twice the resolution, as indicated at images 41 and 44 in FIG. 4.

<Other Embodiment>

Figure 9:
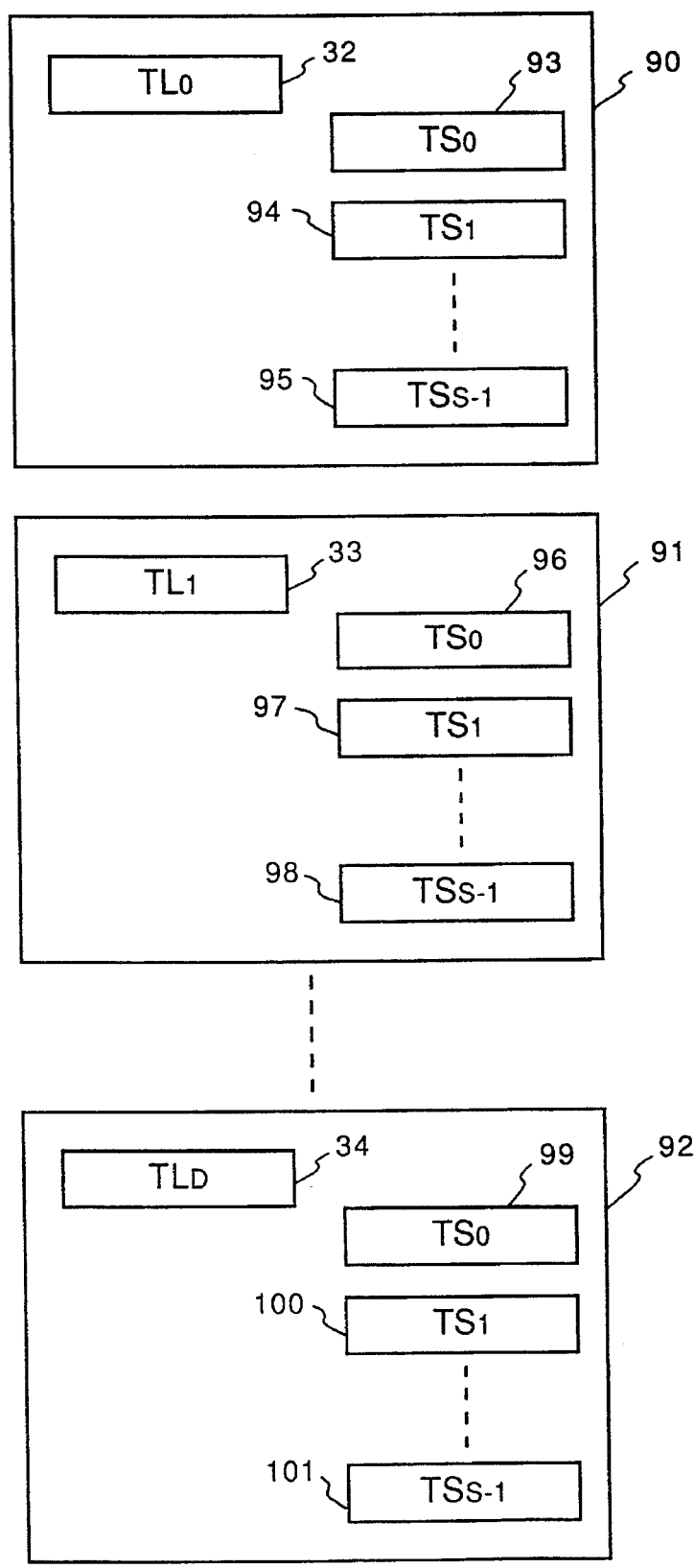
FIG. 9 is a diagram for describing the format of tag information according to another embodiment of the invention.

In the embodiment set forth above, a case is described in which a bit stream possesses tag information for every layer. However, an arrangement may be adopted in which tag information is provided for every stripe. In such case, the tag information would have the configuration as shown at 90, 91, . . . 92 in FIG. 9. Portions in FIG. 9 similar to those in FIG. 3 are designated by like reference characters. The items of information 93~101 in FIG. 9 are byte lengths each of the bit streams from 20 to 28 shown in FIG. 2.

In the embodiment described above, decoding is started from the beginning of the bit stream of each layer. In this embodiment, however, only the bit streams of stripes which include a rectangular area to be displayed in enlarged form need be decoded. In other words, in the example of FIG. 4, it will suffice to decode only the bit streams of strips 15~21 among the bit streams of 100 dpi.

Though the detailed operation in this embodiment is approximately similar to that of the foregoing embodiment, the processing of step S5 in the flowchart shown in FIG. 6 differs. Here it is possible to reduce the number of ineffective decoder operations up to the displayed line by obtaining the leading address of each stripe.

As described above, coded data in a binary-image hierarchical coding system is provided with tag information comprising the number of bytes of the coded data of each stripe, and a decoder is provided for performing decoding based upon this tag information. As a result, only a certain rectangular area within an image presently being displayed can be enlarged (displayed at a higher resolution), and only a very small amount of hardware is necessary at such time.

A window system may be employed as the environment for displaying such an image. In addition, the position on the screen at which the enlarged image is displayed is not limited to that illustrated in the foregoing embodiment.

Further, though an example in which an output is made to an image display unit is described in the foregoing embodiment, this does not impose a limitation upon the present invention, for the teachings of the invention are applicable also to a copying machine or the like.

Furthermore, though the number of bytes of a bit stream is described as an example of the tag information, this does not impose a limitation upon the invention. Moreover, though processing for raising resolution in regular order is described above, this does not impose a limitation upon the invention, for it is possible to raise resolution in random fashion.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the embodiments of the invention, as described above, desired coded data conforming to the resolution of an image to be outputted can be processed at high speed.

As many apparently widely different embodiments of the present invention can be made without departing from the spirit and scope thereof, it is to be understood that the invention is not limited to the specific embodiments thereof except as defined in the appended claims.

For example, as the coding method, a coding method for multi-value image such as the JPEG method may be applied without being limited to the binary image compression such as the JPIG method.

What is claimed is:

1. An image processing apparatus comprising:

storing means for storing hierarchically coded image data and tag information, the hierarchically-coded image data representing a plurality of layers of images whose resolutions are different from each other and the tag information indicating data length of the hierarchically-coded image data representing each of the layers of images;

providing means for providing image data by decoding the hierarchically coded image data stored in said storing means, on the basis of the tag information;

display memory means for storing image data provided from said providing means;

displaying means for displaying an image in accordance with the image data stored in said display memory means; and designating means for designating an area within the image displayed by said displaying means;

wherein said providing means provides first image data having a first resolution by decoding the hierarchically-coded image data on the basis of the tag information, wherein said display memory means stores first image data provided from said providing means and said displaying means displays a first image having a first resolution in accordance with the first image data stored in said display memory means, and wherein said providing means provides second image data, having a second resolution and representing an image in the area designated by said designating means, by decoding the hierarchically-coded image data on the basis of the tag information, said display memory means, which is storing the first image data, stores the second image data provided from said providing means while maintaining the first image data, and said displaying means displays a combined image including the first image having the first resolution and the second image having the second resolution in accordance with the first and second image data stored in said display memory means.

2. The apparatus according to claim 1, wherein said storing means stores the hierarchically coded image data obtained by hierarchically coding binary image data.

3. The apparatus according to claim 1, wherein the second resolution is higher than the first resolution.

4. The apparatus according to claim 1, wherein said designating means designates a desired rectangular area.

5. The apparatus according to claim 1, wherein said providing means extracts the second image data representative of an image in the area designated by said designating means and provides the extracted second image data.

6. The apparatus according to claim 1, wherein said storing means stores the hierarchically coded image data which is obtained by encoding binary image data with a JBIG coding method.

7. The apparatus according to claim 1, wherein said displaying means displays the second image within the first image.

8. An apparatus according to claim 1, wherein said providing means reads out the hierarchically-coded image data to be decoded on the basis of the tag information.

9. An apparatus according to claim 1, wherein the hierarchically-coded image data represents a plurality of strips of images into which the each of the layers of images is divided and wherein the tag information further indicates data length of the hierarchically-coded image data representing each of the stripes of images.

10. An apparatus according to claim 9, wherein said providing means provides the second image data by decoding the hierarchically-coded image data representing stripes of images including the area designated by said designating means.

11. An image processing method comprising;

a first step of storing hierarchically coded image data and tag information, the hierarchically-coded image data representing a plurality of layers of images whose resolutions are different from each other and the tag information indicating data length of the hierarchically-coded image data representing each of the layers of images;

a second step of providing first image data having a first resolution by decoding the hierarchically coded image data, on the basis of the tag information;

a third step of storing the first image data having the first resolution in a display memory;

a fourth step of displaying a first image having the first resolution in accordance with the first image data stored in the display memory;

a fifth step of designating an area within the displayed first image;

a sixth step of providing, by decoding the hierarchically coded image data on the basis of the tag information, second image data having a second resolution and being representative of an image in the designated area;

a seventh step of storing the second image data having the second resolution in a portion of the display memory in which the first image data is stored, while maintaining the first image data stored in an area other than said portion of the display memory; and an eighth step of displaying a combined image including the first image having the first resolution and a second image having the second resolution in accordance with the first and second image data stored in the display memory.

12. The method according to claim 11, wherein the hierarchically coded image data is obtained by hierarchically coding binary image data.

13. The method according to claim 11, wherein the second resolution is higher than the first resolution.

14. The method according to claim 11, wherein the designated area comprises a desired rectangular area.

15. The method according to claim 11, wherein the second image data representative of an image in the designated area is extracted and the extracted second image data is stored in the display memory.

16. The method according to claim 11, wherein the hierarchically coded image data is obtained by encoding binary image data with a JBIG coding method.

17. The method according to claim 11, wherein the second image is displayed within the first image.

18. The method according to claim 11, wherein the hierarchically-coded image data to be decoded is read out on the basis of the tag information.

19. The method according to claim 11, wherein the hierarchically-coded image data represents a plurality of stripes of images into which the each of the layers of images is divided, and wherein the tag information further indicates data length of the hierarchically-coded image data representing each of the stripes of images.

20. The method according to claim 19, wherein the hierarchically-coded image data representing stripes of images including the designated area is decoded so as to provide the second image data.

* * * * *

UNITED STATES PATENT AND TRADEMARK OFFICE
CERTIFICATE OF CORRECTION

PATENT NO. : 5,608,862
DATED : March 4, 1997
INVENTOR(S) : MIYUKI ENOKIDA

It is certified that error appears in the above-identified patent and that said Letters Patent is hereby corrected as shown below:

COLUMN 7

Line 13, "hierarchically coded" should read --hierarchically-coded--.

Line 20, "hierarchically coded" should read --hierarchically-coded--.

Line 53, "hierarchically coded" should read --hierarchically-coded--.

Line 64, "hierarchically coded" should read --hierarchically-coded--.

UNITED STATES PATENT AND TRADEMARK OFFICE
CERTIFICATE OF CORRECTION

PATENT NO. : 5,608,862

DATED : March 4, 1997

INVENTOR(S) : MIYUKI ENOKIDA

It is certified that error appears in the above-indentified patent and that said Letters Patent is hereby corrected as shown below:

COLUMN 8

Line 20, "hierarchically coded" should read --hierarchically-coded--.

Line 28, "hierarchically coded" should read --hierarchically-coded--.

Line 38, "hierarchically" should read --hierarchically- --.

Line 53, ""hierarchically coded" should read --hierarchically-coded--.

Line 65, "hierarchically coded" should read --hierarchically-coded--.

Signed and Sealed this

Nineteenth Day of August, 1997

*Attest:*

BRUCE LEHMAN

*Attesting Officer*       Commissioner of Patents and Trademarks